United States Patent Office 2,807,251
Patented Sept. 24, 1957

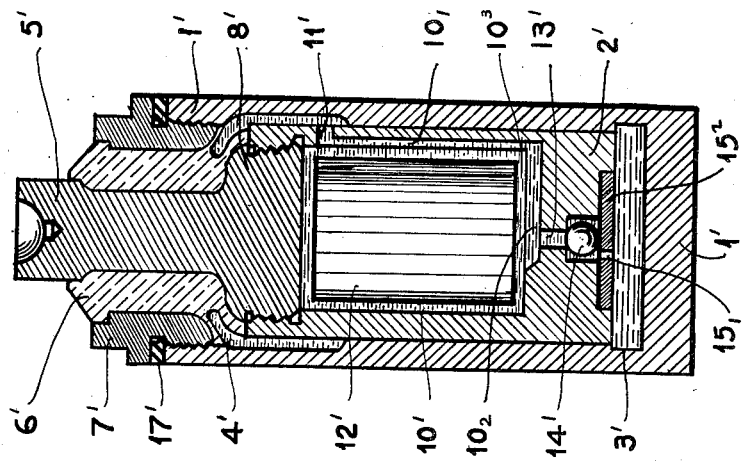
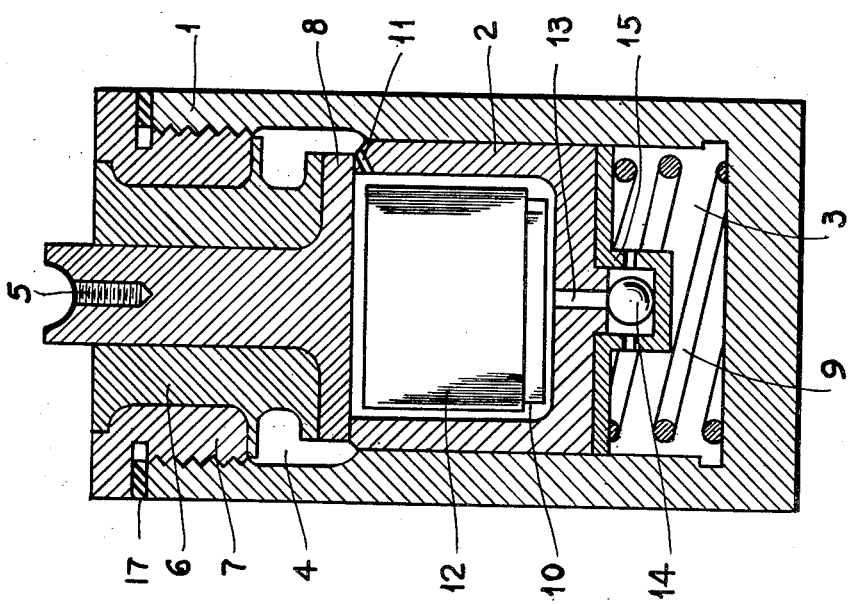

2,807,251

AUTOMATIC CLEARANCE TAKE-UP DEVICE

Lucien Péras, Billancourt, France, assignor to Regie Nationale des Usines Renault, Billancourt, France, a company of France Application January 10, 1955, Serial No. 480,948

Claims priority, application France January 14, 1954

8 Claims. (Cl. 123—90)

The invention relates to an automatic clearance take-up device mainly applicable to the control of engine valves.

The invention can be classed among hydraulic clearance take-up devices forming a completely enclosed system into which the liquid is introduced at manufacture, which has no communication with the exterior and which does not require renewal. A device of this type is described, for example in French specification No. 599,476 of June 11, 1925, for "Automatic Clearance Take-up," in the name of Louis Renault.

Similarly to the device disclosed in the aforesaid specification, the device according to the present invention is applied more particularly to engines as a tappet for taking up clearance in the valve-actuating means, and mainly comprises a variable-volume chamber containing an incompressible liquid and communicating through suitable passages with a compensating chamber containing a liquid reserve maintained at pressure by a compressed gas or by equivalent means. The device according to the invention differs from the device disclosed in the aforesaid specification in the method of arranging the two chambers relatively to one another, in the provision of deformable walls, in the provision of communicating passages, and in the provision of the gas storage means which maintain the pressure in the compensating chamber.

In a variant, the spring between the bottom of the tappet body and the piston is omitted, the resilient ring which connects the push-rod to the body of the apparatus acting as a spring, the piston having been made fast with the base of the tappet, for example by screwing.

In the accompanying drawings:

Fig. 1 illustrates, by way of nonlimitative example, a valve tappet according to the invention in a sectional view, whilst Fig. 2 is a section through a constructional variant.

The device is mainly formed by a cylindrical body 1 which is closed at one end and in which moves a piston 2 so that the volume of the body 1 is divided into two chambers. One of the said chambers is a compression chamber 3 and the other is a compensating chamber 4, and both of the said chambers are completely filled with a liquid of which the viscosity varies little with temperature.

The compression chamber 3 is located between the base of the body 1 and the piston 2.

The cylindrical body 1 is hermetically closed at the top by a plug formed from three bonded-together concentric pieces which are: a push rod 5 surrounded by a resilient ring 6 made of rubber or of synthetic resin material of a resilience sufficient to permit the rod 5 to move longitudinally to an extent at least equal to the variations in length which are to be compensated, the ring 6 being in turn surrounded by the body of the plug 7 which is screwed into the aperture in the body 1 and is sealed with a gasket.

The base 8 of the rod 5 rests upon the skirt of the piston 2 and remains in permanent contact therewith for the reason that the said piston is urged towards the base 8 through the medium of a spring 9 located between the bottom of the cylinder 1 and the piston 2.

The recess 10 in the piston 2 communicates with the compensating chamber 4 (and forms part thereof) through orifices such as 11. The recess 10 receives the gas storage means 12 which has the task of maintaining in the compensating chamber a pressure which varies little from a predetermined value notwithstanding the variation in the space for the liquid. The gas storage means can be formed, for example, according to one known construction, by a cylindrical bellows which is closed by a wall at each end and which contains gas compressed with or without the aid of a spring tending to separate from one another the two end walls.

In the preferred embodiment, the said storage means is formed by a sponge rubber block having closed cells and covered with a layer of fluid-tight rubber. Equivalent synthetic resin materials can be used instead of rubber.

The communicating passages between the compression chamber 3 and the compensating chamber 4 are formed, on the one hand, by the annular clearance between the body 1 and piston 2 and, on the other hand, by an orifice 13 adapted to be closed by a ball 14 maintained in a cage 15. The orifice acts as an extra passage in order that the liquid may flow more easily from the compensating chamber to the compression chamber than vice versa.

When the device is used as a valve tappet, the disc resting upon the cam can be formed, for example, by the solid base of the body 1, guiding being effected by the outer cylindrical surface of the body 1. The free end of the rod 5 is in contact with the valve stem or with the rocker arm push-rod.

The device as applied to valve actuation operates as follows:

When the valve to be actuated is resting upon its seating, the action of the spring 9 compels the body 1 to remain in contact with the cam and also compels the rod 5 to remain in contact with the valve stem (with or without the interposition of rocker-arm actuating means). Hence clearance is taken up between the tappet and the valve without the same being lifted, since the force of the spring 9 is much less than the force required to lift the valve.

At the instant at which the valve is to open, the cam lifts the body 1. The liquid enclosed in the chamber 3 below the piston 2 is subjected to a rapidly increasing pressure and applies the ball 14 to the orifice 13. Thereafter, since the liquid can now only escape slowly through the small annular clearance between the piston 2 and body 1, the liquid lifts the piston 2 and therefore the rod 5 and the valve. If the annular clearance and liquid viscosity are suitably chosen, the relative movement of the piston 2 and body 1 when raising the valve is so slow that the total shortening of the tappet during valve opening is negligible as compared with valve lift.

When the valve recloses, it drops on to its seat before the body 1 drops on to the body of the cam owing to the slight shortening of the tappet during the lifting period, but from this instant the action of the spring 9 lifts the piston 2, the rod 5 being urged into contact with the valve stem, while the liquid passes without obstruction from the chamber 4 to the chamber 3 through the orifice 13 and, in so doing, depresses the ball 14.

During the entire operation, the rod 5 has the same movement relative to the body 1 as has the piston 2. This relative movement is made possible by preserving complete fluid-tightness through the agency of the resilience of the ring 6.

However, any relative movement between the rod 5 and the body 1 results in a variation of the space presented to the liquid filling both the chambers 3 and 4. In order that the latter movement may be effected despite the incompressibility of the liquid and that the pressure variation in the chamber 4 may be relatively small, the compressible gas storage means 12 absorb the variation in volume.

In the variant illustrated in Fig. 2, the rod 5' is made fast with the piston 2' by screwing, for example, the base 8' of the rod 5' into the tapped upper part of the piston.

The piston 2' may in addition have in its inner wall one or more axial grooves 10' and, in its base, one or more transverse grooves $10^2$ for facilitating free flow of the liquid contained in the apparatus from the chamber $10^3$ in the piston to the chamber 4'.

The base of the piston 2' accommodates the housing of the ball 14', which housing is closed by the disc $15^2$, and also accommodates the orifices 15' by which the housing communicates with the chamber 3'.

The tappet operates in a manner similar to the tappet illustrated in Fig. 1, the resilient ring 6' fulfilling all the functions of the spring 9'. Thus, when the valve to be actuated is resting upon its seat, the spring-like resilient ring compels the body 1' to remain in contact with the cam and the rod 5' to remain in contact with the valve stem.

Upon valve opening the operation is the same as described with reference to Fig. 1. Upon valve closure the resilient ring 6', fulfilling the function of the spring 9', causes the piston 2' to rise and urges the rod 5' into contact with the valve stem.

The resilient ring 6' exerts permanently upon the assembly formed by the piston 2' and rod 5' an effort in the sense of an elongation of the tappet to maintain the same in contact both with the cam and also with the valve-actuating means.

I claim:

1. An automatic clearance take-up device for use in valve actuating mechanism in a position interposed between a valve-actuating cam and the stem of the valve, comprising, a cup-shaped cylindrical body having a closed lower base adapted to be engaged by said actuating cam, a cup-shaped piston having a generally closed base, the piston being telescoped within the body with the bases of the piston and body adjacent each other and forming a compression chamber, a tappet having an end centrally positioned within the upper end of the body in thrusting engagement with the upper end of the piston, a resilient annular sealing means interposed between the tappet and the upper end of the body, a compensating chamber in the upper end of the device, a relatively large recess in the piston, a sealed compressible gas-containing body loosely mounted in the recess, an orifice providing free communication between the recess and the compensating chamber, a passage between the recess and the compression chamber, and normally open check-valve means cooperating with the passage to close the passage upon subjection of the compression chamber to pressure, the compression chamber, recess, and compensating chamber being filled at all times with liquid maintained under appreciable pressure by the gas-containing body, the resilient sealing member constantly urging the tappet outwardly of the body of the take-up device toward a position in which the tappet engages the valve stem.

2. An automatic clearance take-up device as claimed in claim 1, in which there is sufficient clearance between the said wall of the piston and the confronting inner wall of the body to permit the slow passage of liquid therebetween.

3. An automatic clearance take-up device as claimed in claim 2, in which the tappet has a broad lower end spanning the upper end of the piston, and the recess is formed between the lower end of the tappet and the inner bottom and side wall surfaces of the piston.

4. An automatic clearance take-up device as claimed in claim 3, in which the sealing means between the body and the tappet comprises a relatively deep annular sleeve of resilient plastic material, the compensating chamber is annular, is located generally at the upper end of the piston, and is coaxial therewith, the compensating chamber is at least partially bounded by a wall of the body and a surface of the sealing means, and the orifice extends generally radially through the side wall of the piston.

5. An automatic clearance take-up device for use in valve actuating mechanism in a position interposed between a valve-actuating cam and the stem of the valve, comprising, a cup-shaped cylindrical body having a closed lower base adapted to be engaged by the actuating cam, a cup-shaped piston having a generally closed base, the piston being telescoped within the body with the bases of the piston and body adjacent each other and defining a compression chamber, a tappet having an end centrally positioned within the upper end of the body in thrusting engagement with the upper end of the piston, a resilient annular sealing means interposed between the tappet and the upper end of the body, a compensating chamber in the upper end of the device, a relatively large recess in the piston, a sealed compressible gas-containing body loosely mounted in the recess, an orifice providing free communication between the recess and the compensating chamber, a passage between the recess and the compression chamber, and normally open check-valve means cooperating with the passage to close the passage upon subjection of the compression chamber to pressure, the compression chamber, recess and compensating chamber being filled at all times with liquid maintained under appreciable pressure by the gas-containing body, compression spring means in the compression chamber acting between the bases of the body and the piston, the compression spring means and the resilient sealing member constantly urging the tappet outwardly of the body of the take-up device toward a position in which the tappet engages the valve stem.

6. An automatic clearance take-up device as claimed in claim 5, in which the tappet has a broad lower end, the lower end of the tappet spanning the upper end of the piston substantially to close said recess in the piston.

7. An automatic clearance take-up device for use in valve actuating mechanism in a position interposed between a valve-actuating cam and the stem of such valve, comprising a cup-shaped cylindrical body having a closed lower base adapted to be engaged by the actuating cam, a cup-shaped piston having a generally closed base, the piston being telescoped within the body with the bases of the piston and body adjacent each other to form a compression chamber, a tappet having an enlarged lower end centrally positioned within the upper end of the body and attached to the upper portion of the side wall of the piston to form with the space within the piston a large central recess, a resilient annular sealing means interposed between the tappet and the upper end of the body, and constituting the sole resilient means acting between the body and the piston, an annular compensating chamber in the upper end of the device coaxial therewith, a sealed compressible gas-containing body of relatively large volume loosely mounted in the recess in the piston, an orifice providing free communication between the recess and the compensating chamber, a passage between the recess and the compression chamber, and normally open check-valve means cooperating with the passage to close the passage upon subjection of the compression chamber to pressure, the compression chamber, recess and compensating chamber being filled at all times with liquid maintained under appreciable pressure by the gas-containing body, the resilient sealing member constantly urging the tappet upwardly of the body of the take-up device toward a position in which the tappet engages the valve stem.

8. An automatic clearance take-up device as claimed in claim 7, in which the central recess in the piston is cylindrical, the gas-containing body in such recess is cylindrical and fits into said recess with relatively small radial and end clearances, and the inner side wall of the piston is provided with longitudinally extending liquid-conducting grooves.

References Cited in the file of this patent

UNITED STATES PATENTS

| | | |
|---|---|---|
| 1,062,580 | Bollee | May 27, 1913 |
| 2,109,815 | Best | Mar. 1, 1938 |
| 2,109,816 | Best | Mar. 1, 1938 |
| 2,526,593 | Voorhies | Oct. 17, 1950 |
| 2,547,798 | Truxell | Apr. 3, 1951 |
| 2,577,852 | Hufferd | Dec. 11, 1951 |
| 2,654,356 | Oldberg | Oct. 6, 1953 |
| 2,694,388 | Gammon et al. | Nov. 16, 1954 |

FOREIGN PATENTS

| | | |
|---|---|---|
| 562,101 | Great Britain | June 19, 1944 |